US006433869B1

(12) United States Patent
Barnard et al.

(10) Patent No.: US 6,433,869 B1
(45) Date of Patent: Aug. 13, 2002

(54) WAVELENGTH MEASUREMENT BY DISPERSION TIMING

(75) Inventors: Chris Barnard, Sunnyvale, CA (US); Kexing Liu, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/465,998

(22) Filed: Dec. 17, 1999

(51) Int. Cl.[7] .............................. G01J 3/12; G01J 3/02
(52) U.S. Cl. .................... 356/326; 356/328; 250/226
(58) Field of Search ................. 356/326, 328; 250/226

(56) References Cited

U.S. PATENT DOCUMENTS

| | | | | |
|---|---|---|---|---|
| 5,144,374 A | * | 9/1992 | Grego | 356/326 |
| 5,225,894 A | * | 7/1993 | Nicholson et al. | 356/419 |
| 5,319,435 A | | 6/1994 | Melle et al. | 356/32 |
| 5,432,602 A | * | 7/1995 | Sharma et al. | 356/326 |
| 5,469,265 A | | 11/1995 | Measures et al. | 356/419 |
| 5,619,332 A | * | 4/1997 | Nicholson | 356/419 |
| 5,694,501 A | | 12/1997 | Alavie et al. | 385/37 |
| 5,825,792 A | | 10/1998 | Villeneuve et al. | 372/32 |

OTHER PUBLICATIONS

Markus–Christian Amann, "Single–Mode and Wavelength –Tunable Laser Diodes", http://jur.pfi.lt/conf/wocsdice/ready/21.html, Jun. 22, 1999, pp 1–2.

T. Coroy, R.M. Measures, T.H. Wood, "Active Wavelength Measurement System Using an InGaAs–InP Quantum–Well Electroabsorption Filtering Detector", IEEE Photonics Technology Letters, vol. 8, No. 12, Dec. 1996; pp 1686 to 1688/.

A. Goel & R.K. Shevgaonkar, "Wide–Band Dispersion Compensating Optical Fiber", IEEE Photonics Technology Letters, vol. *, No. 12, Dec. 1996, pp 1668–1670.

Salim K. Juma, "Chirped Bragg Gratings Compensate for Dispersion", http://www.bragg.ca/chirped.html.

* cited by examiner

Primary Examiner—F. L. Evans

(57) ABSTRACT

A novel wavelength measurement method wherein an optical pulse is launched into a dispersive medium with known dispersion properties, such as a dispersion compensating fibre or a dispersion compensating Bragg grating. The specific wavelength of the dispersion-induced light beam is obtained by measuring the propagation time delay through the dispersive medium and relating that propagation time to the calibrated dispersive medium.

14 Claims, 3 Drawing Sheets

WAVELENGTH MEASUREMENT BY DISPERSION TIMING

FIELD OF THE INVENTION

The present invention pertains to monitoring and measuring optical sources, and more particularly, to wavelength measurement of an optical source.

BACKGROUND OF THE INVENTION

The widespread and exponential growth of the communication network systems during the past few years has provided for extensive proliferation of optics-based designs and systems. Due to the higher bandwidth and lower losses associated with optical signal transmission, optoelectronic systems are increasingly becoming the prevalent platforms for the implementation of many high speed network communication systems.

Because future high capacity services will have many different optical channels, methods that use the same equipment to monitor and measure the wavelength of multiple channels are preferable since they share the total cost among numerous channels.

The development of a fast and accurate wavelength measurement scheme is also desirable for a number of applications, such as distributed feedback lasers used in wavelength division multiplexed (WDM) communication systems or wavelength tunable lasers, wherein one or more wavelengths need be measured and monitored in order to adjust and stabilize the wavelength of the source.

A customary method of determining the wavelength of a light source is to split the signal into two paths and observe the interference pattern between the signal and a delayed version of itself, a technique commonly referred to as the Michelson interferometer technique. The wavelength of the input signal can then be obtained by carefully comparing the period of the zero-crossings of the resulting waveform with the waveform of a known standard.

The Michelson interferometer method requires a highly accurate laser wavelength reference and has moving mechanical parts that are quite bulky and necessitate fastidious alignment and calibration. Also, in the Michelson interferometer, the ratio of the index of refraction at the reference wavelength to the index of refraction at the unknown wavelength is a function of the ambient environment (such as humidity, gas content, temperature, etc.) which ultimately affects the accuracy of the measurement. In addition, erroneous results may be obtained if a modulated signal is present at the input of the Michelson interferometer.

Various other existing wavelength measurement techniques, such as the Static Fabry-Perot, the Frizeau interferometer and wavelength discriminators have been proposed, but they fail to provide a practical solution to alignment and detection problems commonly associated with accurate wavelength measurement. For instance, the Static Fabry-Perot interferometer has filters with repeated bandpass effect. The repeated bandpass phenomenon causes inaccuracy in the measurement since ascertaining which bandpass is being used in the repeated filter response is difficult. The Fizeau interferometer is only optimum for measuring light sources with low frequency modulation and suffers from poor sensitivity. Although wavelength discriminators offer a simple and cost effective solution to wavelength measurement, this comes at the cost of reduced performance and accuracy.

Hence, there is a need for a simple and accurate wavelength measuring technique. Preferably, the new method would eliminate the alignment and calibration requirements associated with mechanical parts used in many existing wavelength measurement set-ups and would be insensitive to changes in the testing environment. As well, the new technique would desirably be functionally precise when used for measuring modulated signals or in combination with optical filters.

SUMMARY OF THE INVENTION

The present invention addresses these key issues by providing a robust, fast, accurate, compact and potentially low cost method and apparatus for determining the wavelength of a particular light source which can be easily integrated into existing optoelectronics systems.

The invention can be used (a) as a means for determining the wavelength of a light beam, (b) as a wavemeter used for calibrating the wavelength steps of a tunable laser. A person skilled in the art may readily devise various other applications u sing the principles of th e invention.

The present invention involve s th e measurement of the time it takes for a pulse of light to propagate through an optical dispersive medium having known dispersion properties relative to wavelength. This propagation delay time can then be translated to wavelength using the calibrated properties of the dispersive medium.

In the wavelength measurement method using dispersion timing, the entire system consists of static components that are less bulky and less sensitive to inaccurate measurement than mechanically moving parts. This in turn offers great flexibility in design and provides for excellent structural integration in the design and implementation of a complex optical architecture. Also, another interesting aspect of the current invention is its design simplicity, providing for a robust, easily implementable and wavelength measurement system. Because this novel approach provides for precise optical monitoring of the wavelength, it becomes an optimal platform for wavelength stabilization to reduce cross-talk for use, for instance, in a WDM environment.

Yet another added advantage of the proposed method is that increasing the resolution only comes at the cost of reduced sensitivity, and not increased complexity, as with mechanical wavemeters.

Another advantage over the Michelson wavemeter is that, because it has no moving parts, calibration is easily maintained and variations of dispersion with temperature can also be calibrated.

Other aspects and advantageous features of the present invention will become apparent to those ordinarily skilled in the art upon review of the following description of specific embodiments of the invention in conjunction with the accompanying figures.

DETAILED DESCRIPTION OF THE PREFERRED EMBODIMENTS

Figure 1:
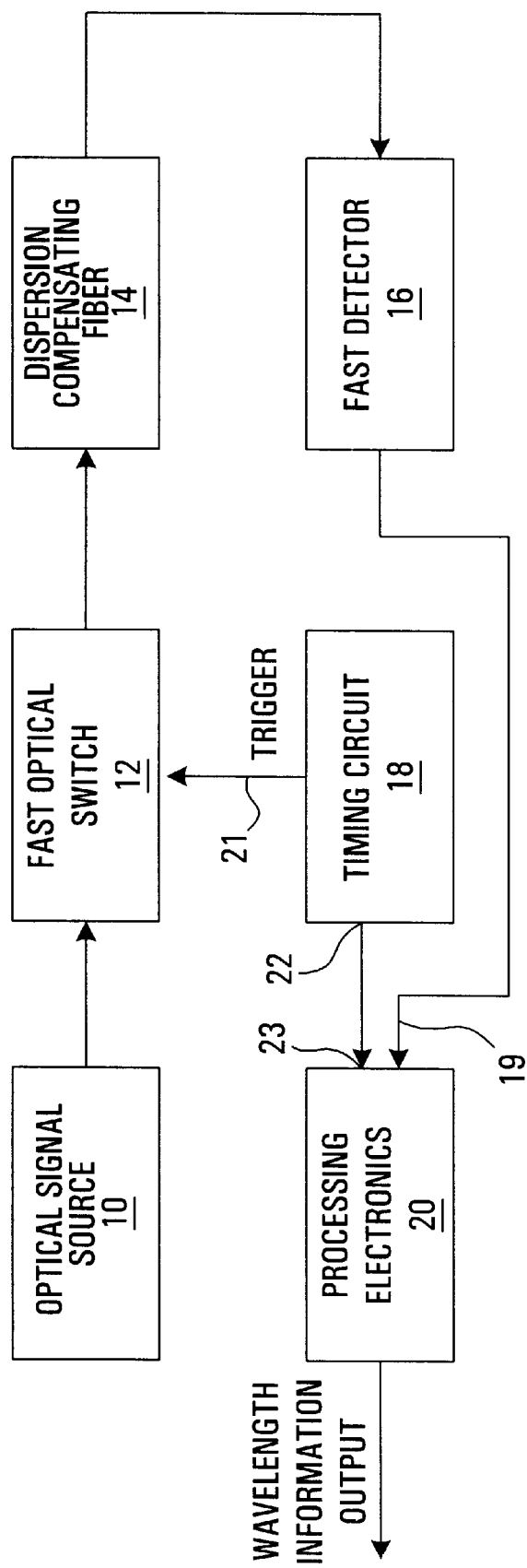
FIG. 1 is a block diagram of a wavelength measurement system according to the invention using a dispersion compensating fiber (DCF) in transmission mode.

With reference to FIG. 1, an optical signal source 10 has an output connected through a fast optical switch 12 to one end of a dispersive medium in the form of a DCF 14, the other end of which is connected to a fast detector 16. An output of the fast detector 16 is connected to a first input 19 of process electronics circuitry 20 which may be a high speed oscilloscope from Hewlett Packard or Tektronix. A timing circuit 18 which may be a programmable clock/pulse generator, has a first output 21 which is connected to the optical switch 12 and a second output 22 which is connected to a second input 23 of the process electronics 20.

In operation, an optical signal from source 10 is gated by the fast optical switch 12 in response to a trigger signal from the timing circuit 18, thereby creating an optical pulse composed of the wavelength which is to be determined. The time-of-flight (start time) of the pulse is essentially the time the trigger signal fires and that is stored in the process electronics 20. As the optical pulse propagates through the DCF 14, its propagation speed depends upon the chromatic dispersion of the DCF at the particular wavelength of the pulse. The fast detector 16 detects the arrival of the dispersion-affected pulse and signals the time-of-arrival to the process electronics 20. As the time-of-flight is already stored in the process electronics 20, the time for the pulse to propagate through the DCF is obtained in the process electronics 20 by subtracting the time-of-flight from the time-of-arrival. If the dispersion vs wavelength of the DCF is calibrated then the propagation time translates to a measurement of the wavelength. The sensitivity of this technique expressed as the wavelength resolution, $\Delta\gamma$ can be obtained from the expression:

$$\Delta\lambda = \frac{\Delta t}{FOM \times DR}$$

where $\Delta t$ is the resolution of the time measurement measured in seconds, DR is the dynamic range of the detector (maximum allowable loss in dB), and FOM is the figure of merit of the dispersive device measured in ps/nm/dB. The FOM can be used to characterize the measurand quality from the losses' point of view. The FOM specifies how far the fast detector is from the quantum light performance, or in other words, how much the noise overwhelms the minimum possible output signal.

The optical signal source 10 may emit optical signals of different wavelengths rather than a single wavelength. The operation of the circuit is unchanged except that the fast detector would detect different times of arrival for the different wavelengths and each time-of-arrival would be compared with a single time-of-flight to obtain the time for each wavelength to propagate through the DCF. In this way each wavelength can be determined.

Figure 2:
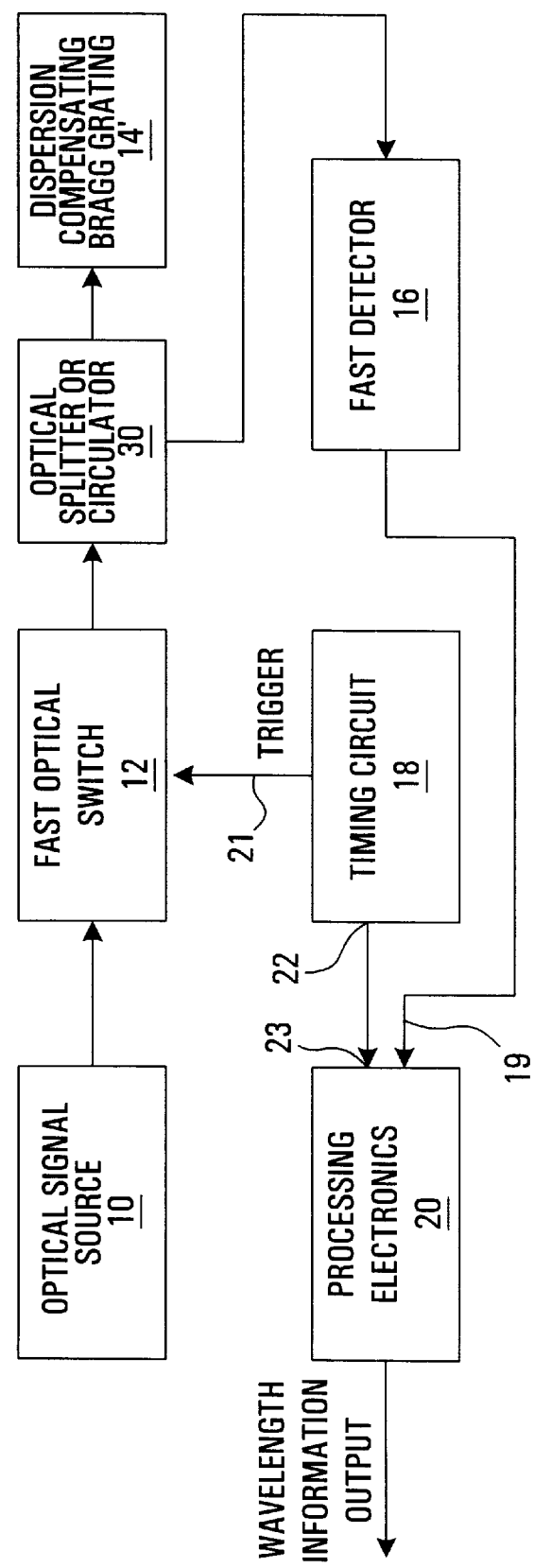
FIG. 2 is a block diagram of a wavelength measurement system according to the invention using a dispersion compensating Bragg grating (DCG)
Figure 3:
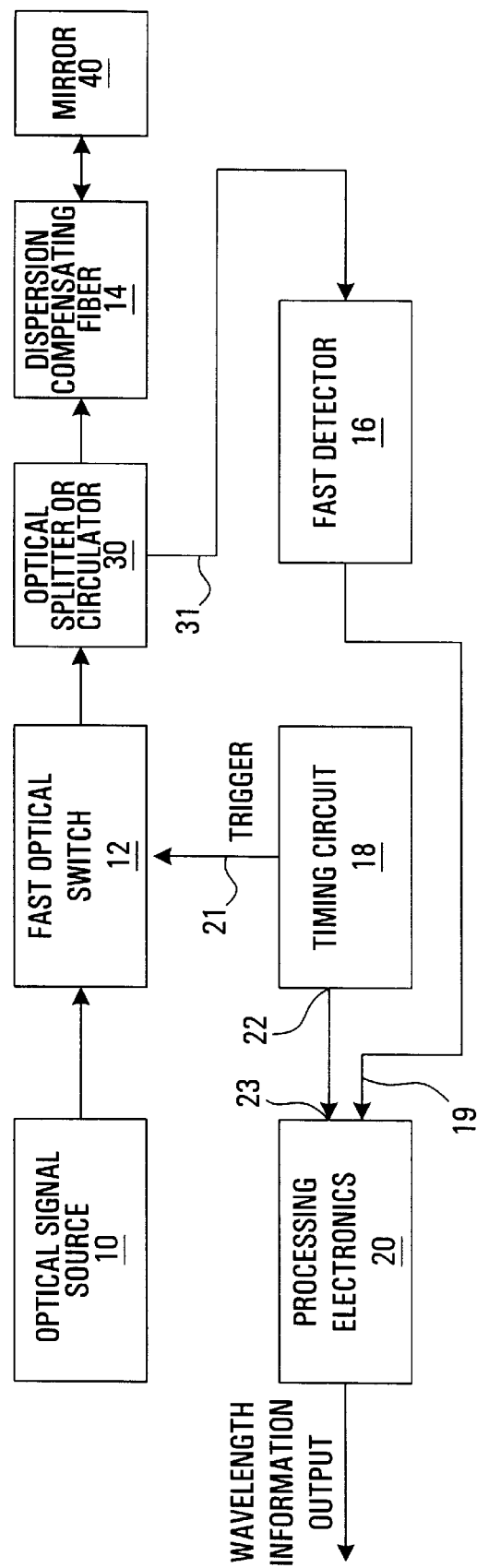
FIG. 3 is a block diagram of a wavelength measurement system according to the invention using a DCF in reflection mode.

Referring to FIG. 3 this shows a system identical to that of FIG. 1 except that the DCF 14 is arranged to operate in the reflection mode instead of the transmission mode which effectively doubles the length of the DCF. Thus, an optical splitter orcirculator 30 is located between the first optical switch 12 and the input end of the DCF 14 and a mirror 40 is positioned at the other end of the DCF. In this configuration the fast detector 16 is fed by an output 31 of the circulator 30. Referring to FIG. 2, this is similar to FIG. 3 except that a dispersion compensating Bragg grating (DCG) 14' replaces the DCF and mirror of FIG. 3.

The operation of the systems of FIGS. 2 and 3 is similar to the transmission mode of FIG. 1 except that the optical pulses emanating from the fast optical switch 12 and passing into the dispersive medium are reflected back out the same end and passed from the circulator 30 to the fast detector 16.

Commercially available dispersion compensating fibres (DCFs) or dispersion compensating Bragg grating fibres (DCGs) have very low insertion loss (typically 5 dB), thereby making them an attractive choice for use as the dispersive medium. For example, for a DCF with a linear dispersion of 100 ps/nm/km in the 1550 nm wavelength window and loss of approximately 0.5 dB/km, the FOM is about 200 ps/nm/dB. If the fast detector has sensitivity of 20 dB below its input power, then it is possible to obtain a dispersion value of 4000 ps/nm. Hence, in order to measure a wavelength with 0.025 nm resolution, the propagation delay needs to be measured with a 100 ps resolution. This is well within the realistic measurement range of the currently available optoelectronic detectors and timing circuits.

DCGs are expected to have higher FOMs than DCFs but they are presently limited to a narrower wavelength range than DCFs and they do not yet have a smooth dispersion profile. These problems are related to present manufacturing limitations and are not expected to be fundamental limitations.

It is noted that the resolution of the method described above can be increased by increasing the dispersion or by shortening the pulse duration (width).

Once dispersion is calibrated with a known reference source, it will not vary significantly over time. In an alternative embodiment, an on board reference source that is calibrated to a gas absorption line, is used to check the accuracy of the technique.

Persons skilled in the art will appreciate that there are yet more alternative implementations and modifications possible to implement a wavelength measurement technique by dispersion timing, and that the above implementation is only an illustration of this embodiment of the invention. The scope of the invention, therefore, is only to be limited by the claims appended hereto.

What is claimed is:

1. A method for determining the wavelength of at least one optical signal emanating from an optical signal source, comprising the steps of:
   (a) triggering an optical switch to gate the optical signal and derive an optical pulse;
   (b) transmitting the optical pulse through a dispersive medium with known dispersion properties relative to wavelength;
   (c) measuring the propagation delay time for the pulse to propagate through the dispersive medium;
   (d) ascertaining the wavelength of the optical signal on the basis of the measured propagation delay time and the known dispersion properties;
      wherein the dispersive medium is a dispersion compensating Bragg grating.

2. A method according to claim 1, comprising providing a reference light source the wavelength of which is known and from time to time checking the accuracy of the method by determining the wavelength of the reference light source using the steps of claim 1, and comparing the results with the known value of the wavelength reference light source.

3. A method according to claim 1, wherein the optical signal source provides a plurality of optical signals of different wavelengths.

4. A method for determining the wavelength of at least one optical signal emanating from an optical signal source, comprising the steps of:
   (a) triggering an optical switch to gate the optical signal and derive an optical pulse;
   (b) transmitting the optical pulse through a dispersive medium with known dispersion properties relative to wavelength;

(c) measuring the propagation delay time for the pulse to propagate through the dispersive medium;

(d) ascertaining the wavelength of the optical signal on the basis of the measured propagation delay time and the known dispersion properties;

wherein the step of transmitting the pulse of light through the dispersive medium comprises transmitting the pulse in a first direction through the dispersive medium, reflecting the pulse and passing the reflected pulse in the opposite direction through the dispersive medium.

5. A method according to claim 4, comprising providing a reference light source the wavelength of which is known and from time to time checking the accuracy of the method by determining the wavelength of the reference light source using the steps of claim 4 and comparing the results with the known value of the wavelength reference light source.

6. A method according to claim 4, wherein the optical signal source provides a plurality of optical signals of different wavelengths.

7. Apparatus for determining the wavelength of an optical signal from an optical signal source comprising a fast optical switch having an input for receiving the optical signal from the source and having an output;

a timing circuit arranged to trigger the fast optical switch to derive a pulse of light at the output of the fast optical switch;

process electronic circuitry having an input connected to the timing circuit and storing as the time-of-flight of the pulse the trigger time of the trigger circuit;

a dispersive medium having an input connected to the output of the fast optical switch and having an output, the dispersive medium having known dispersion properties relative to wavelength;

a fast detector having an input connected to the output of the dispersive medium and an output connected to the process electronic circuitry, the fast detector being arranged to detect the arrival of the pulse from the dispersive medium and trigger the process electronic circuitry to record the time-of-arrival;

wherein the process electronic circuitry is arranged to subtract the time-of-flight from the time-of-arrival to derive a pulse propagation time from which the wavelength of the optical signal can be obtained; and wherein the dispersive medium is a dispersion compensating Bragg grating (DCG) and one of a circulator and optical splitter is connected between the fast optical switch and the DCG.

8. Apparatus according to claim 7, further comprising a reference light source, the wavelength of which is known, connectable to the input of the fast optical switch.

9. Apparatus for determining the wavelength of an optical signal from an optical signal source comprising:

a fast optical switch having an input for receiving the optical signal from the source and having an output;

a timing circuit arranged to trigger the fast optical switch to derive a pulse of light at the output of the fast optical switch;

process electronic circuitry having an input connected to the timing circuit and storing as the time-of-flight of the pulse the trigger time of the trigger circuit;

a dispersive medium having an input connected to the output of the fast optical switch and having an output, the dispersive medium having known dispersion properties relative to wavelength;

a fast detector having an input connected to the output of the dispersive medium and an output connected to the process electronic circuitry, the fast detector being arranged to detect the arrival of the pulse from the dispersive medium and trigger the process electronic circuitry to record the time-of-arrival;

wherein the process electronic circuitry is arranged to subtract the time-of-flight from the time-of-arrival to derive a pulse propagation time from which the wavelength of the optical signal can be obtained; and wherein the dispersive medium is a dispersion compensating fiber operation (DCF) in reflection mode, the input and the output of the dispersive medium being the same one end of the dispersion compensating fiber, a mirror is located at another end of the dispersive medium and one of a circulator and optical splitter is connected between the fast optical switch and the DCF.

10. Apparatus according to claim 9, further comprising a reference light source, the wavelength of which is known, connectable to the input of the fast optical switch.

11. A method for determining the wavelength of at least one optical signal emanating from an optical signal source, comprising the steps of:

(a) triggering an optical switch to gate the optical signal and derive an optical pulse;

(b) transmitting the optical pulse in a first direction through a dispersion compensating Bragg grating having known dispersion properties relative to wavelength;

(c) reflecting the pulse and passing the reflected pulse in the opposite direction through the dispersion compensating Bragg grating;

(d) measuring the propagation delay time for the pulse to propagate in both directions through the dispersion compensating Bragg grating; and (e) ascertaining the wavelength of the optical signal on the basis of the measured propagation delay time and the known dispersion properties of the dispersion compensating Bragg grating.

12. A method for determining the wavelength of at least one optical signal emanating from an optical signal source, comprising the steps of:

(a) triggering an optical switch to gate the optical signal and derive an optical pulse;

(b) transmitting the pulse of light in a first direction through a dispersion compensating fiber operating in reflection mode and having known dispersion properties relative to wavelength;

(c) reflecting the pulse and passing the reflected pulse in the opposite direction through the dispersion compensating fiber operating in reflection mode;

(d) measuring the propagation delay time for the pulse to propagate in both directions through the fiber operating in reflection mode; and (e) ascertaining the wavelength of the optical signal on the basis of the measured propagation delay time and the known dispersion properties of the fiber operating in reflection mode.

13. Apparatus for determining the wavelength of an optical signal from an optical signal source comprising:

a fast optical switch having an input for receiving the optical signal from the source and having an output;

a timing circuit arranged to trigger the fast optical switch to derive a pulse of light at the output of the fast optical switch;

process electronic circuitry having an input connected to the timing circuit and storing as the time-of-flight of the pulse the trigger time of the trigger circuit;

one of a circulator and an optical splitter having an input connected to the output of the fast optical switch and having a first output and a second output;

a dispersion compensating Bragg grating connected to the first output of said one of a circulator and an optical splitter, the dispersion compensating Bragg grating having known dispersion properties relative to wavelength;

a fast detector having an input connected to the second output of said one of a circulator and an optical splitter and an output connected to the process electronic circuitry, the fast detector being arranged to detect the arrival of the pulse from the dispersion compensating Bragg grating and trigger the process electronic circuitry to record the time-of-arrival;

wherein the process electronic circuitry is arranged to subtract the time-of-flight from the time-of-arrival to derive a pulse propagation time from which the wavelength of the optical signal can be obtained.

14. Apparatus for determining the wavelength of an optical signal from an optical signal source comprising:

a fast optical switch having an input for receiving the optical signal from the source and having an output;

a timing circuit arranged to trigger the fast optical switch to derive a pulse of light at the output of the fast optical switch;

process electronic circuitry having an input connected to the timing circuit and storing as the time-of-flight of the pulse the trigger time of the trigger circuit;

a dispersion compensating fiber operating in reflection mode and having known dispersion properties relative to wavelength, the input and the output of the dispersion compensating fiber being the same one end of the dispersion compensating fiber, a mirror located at another end of the dispersion compensating fiber operating in reflection mode;

one of a circulator and an optical splitter having a first output and a second output and connected between the fast optical switch and the dispersion compensating fiber with the first output connected to the one end of the dispersion compensating fiber;

a fast detector having an input connected to the second output of said one of a circulator and an optical splitter and an output connected to the process electronic circuitry, the fast detector being arranged to detect the arrival of the pulse from the dispersion compensating fiber operating in reflection mode and trigger the process electronic circuitry to record the time-of-arrival;

wherein the process electronic circuitry is arranged to subtract the time-of-flight from the time-of-arrival to derive a pulse propagation time from which the wavelength of the optical signal can be obtained.

* * * * *

UNITED STATES PATENT AND TRADEMARK OFFICE
CERTIFICATE OF CORRECTION

PATENT NO.   : 6,433,869 B1
DATED        : August 13, 2002
INVENTOR(S)  : Chris Barnard and Kexing Liu It is certified that error appears in the above-identified patent and that said Letters Patent is hereby corrected as shown below:

Column 2,
Line 53, add paragraph -- The present invention is described with reference to the following DRAWINGS, in which: --.

Column 4,
Line 27, add paragraph -- Although a preferred embodiment of the present invention is described in detail herein for a specific design implementation, it should be understood that the scope of the present invention is not meant to be limited to such an embodiment. --

Signed and Sealed this

First Day of April, 2003

JAMES E. ROGAN
*Director of the United States Patent and Trademark Office*